United States Patent [19]
Jin

[11] Patent Number: 5,937,102
[45] Date of Patent: Aug. 10, 1999

[54] IMAGE RECONSTRUCTION

[75] Inventor: Michael Y. Jin, Pasadena, Calif.

[73] Assignee: California Institute of Technology, Pasadena, Calif.

[21] Appl. No.: 08/729,230

[22] Filed: Oct. 9, 1996

[51] Int. Cl.$^6$ .............. G06K 9/00; G06K 9/32; G06K 9/36; G06K 9/64

[52] U.S. Cl. .............. 382/276; 382/131; 382/279; 382/293

[58] Field of Search .............. 382/131, 276, 382/279, 293

[56] References Cited

U.S. PATENT DOCUMENTS

| | | | |
|---|---|---|---|
| 4,023,036 | 5/1977 | Barrett et al. | 250/237 R |
| 5,065,436 | 11/1991 | Matsumura | 382/131 |
| 5,119,027 | 6/1992 | Ehrhardt | 324/309 |
| 5,170,439 | 12/1992 | Zeng et al. | 382/131 |
| 5,307,264 | 4/1994 | Waggener et al. | 378/14 |
| 5,375,156 | 12/1994 | Kuo-Petravic et al. | 378/9 |

OTHER PUBLICATIONS

Henry J. Scudder, "Introduction to Computer Aided Tomography", Jun. 1978, Proceedings of the IEEE, vol. 66, pp. 628–637.

Henry Stark, et al., Direct Fourier Reconstruction in Computer Tomography, Apr. 1981, IEEE Transactions on Acoustics, Speech and Signal Processing, vol. ASSP–29, No. 2, pp. 237–244.

David C. Munson, et al., "A Tomographic Formulation of Spotlight–Mode Synthetic Aperture Radar", Aug. 1983, Proceedings of the IEEE, vol. 71, No. 8, pp. 917–925.

Dean L. Mensa, et al., "Coherent Doppler Tomography for Microwave Imaging", Feb. 1983, Proceedings of the IEEE, vol. 71, No. 2, pp. 254–261.

Stephen J. Norton, "Reconstruction of a two–dimensional reflecting medium over a circular domain: Exact solution", Apr. 1980, J. Acoust. Soc. Am., vol. 67, No. 4, pp. 1266–1273.

Mita D. Desai et al., "Convolution Backprojection Image Reconstruction for Spotlight Mode Synthetic Aperture Radar", Oct. 1992, IEEE Transactions on Image Processing, vol. 1, No. 4, pp. 505–517.

Skolnik, *Radar Handbook*, pp. 3–5.

*Primary Examiner*—Bipin Shalwala
*Assistant Examiner*—Daniel G. Mariam
*Attorney, Agent, or Firm*—Fish & Richardson P.C.

[57] ABSTRACT

Am image is reconstructed from x-ray attenuation data or other types of data using fast Fourier circular convolution (FFCC). Reference spectra and mask functions are generated for the FFCC. Also, the data is zero-padded for the FFCC. The data is transformed, multiplied by a radial filter, and transposed in order to construct the image by FFCC. The reconstructed image is converted from polar to Cartesian coordinates for viewing.

2 Claims, 8 Drawing Sheets

FIG. 10

IMAGE RECONSTRUCTION

FIELD OF THE INVENTION

The present invention relates to image reconstruction techniques for generating images.

BACKGROUND AND SUMMARY OF THE INVENTION

Figure 1:
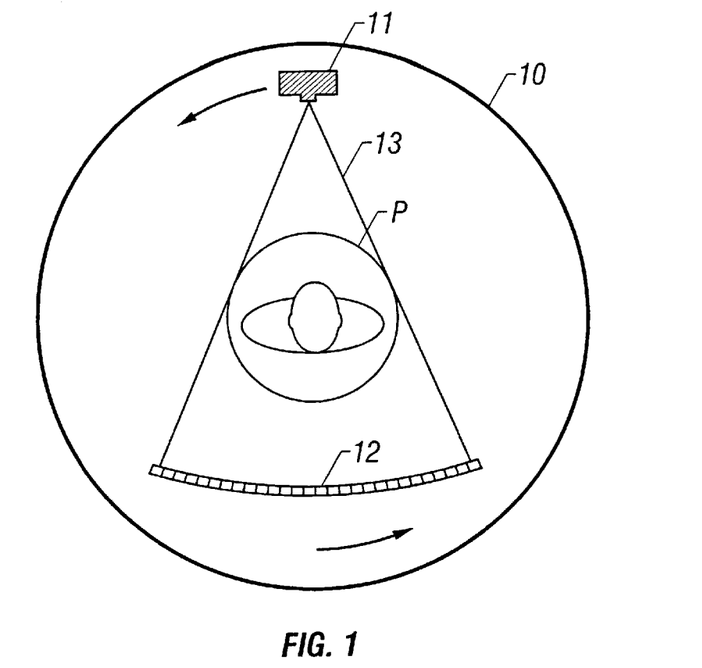
FIG. 1 is a block diagram of a CT scanner.

Various techniques, including computed tomography (CT), positron emission tomography (SET), and ultrasonic reflective tomography (URT), can be used to generate an image from a scanned data set of a subject. For example, a CT scanning system is used to produce cross-sectional images of a portion or "slice" of a patient. A CT scanning system 10, shown in FIG. 1, includes a source of collimated X-rays 11 and an array of X-ray detectors 12. A patient P is positioned between the source 11 and detectors 12. The X-ray source 11 revolves about the patient so that X-ray attenuation measurements may be obtained from many different angles. The X-ray source 11 may produce a fan-shaped beam 13 (or parallel beams by means of a translational movement of the x-ray source) that passes through the patient and impinges upon the detectors 12, generating attenuation measurements. A complete scan of the patient includes a set of X-ray attenuation measurements which are made at different angular orientations of the X-ray source 11 and detectors 12 in one revolution about the patient.

An attenuation measurement at a given orientation is referred to as a view, and the set of measurements at a view form a transmission profile. Each transmission profile contains an array of digital data samples. Each digital data sample represents the amount of the attenuated X-ray collected by one of the detectors. The profiles form a complete scan and are stored in memory as raw, unprocessed data. In two-dimensional CT raw data, the angular coordinate is referred to as the azimuth direction, and the other coordinate is referred to as the radial direction. The transmission profiles from a scan are processed to reconstruct an image which reveals the anatomical structures in a cross-section or slice of the patient. The reconstruction process converts the attenuation measurements from a scan into integers called CT numbers or Hounsfield units.

Convolution backprojection (CBP) is one technique for image reconstruction. CBP includes two general processing steps: (1) a finite impulse response, also referred to as kernel, is convoluted with each transmission profile; and (2) a line integral following the trace of a curve is performed to generate each output image pixel. This curve contains all the points with the maximum attenuation on each transmission profile caused by the target of the output pixel. For a fan beam system, an array of weights is multiplied with the data samples during the line integral process. When higher accuracy is required, the output of the first step is oversampled for a finer sample spacing such that the backprojection step may follow a more precise curve. CBP has a relatively slow processing throughput rate as compared to the direct Fourier method described in the following paragraph.

Another image reconstruction technique uses the direct Fourier method. The direct Fourier method has three basic processing steps: (1) performing a fast Fourier transform (FFT) for each transmission profile, resulting in a two-dimensional Fourier spectrum of the image in polar coordinates, with uniform spacing in the azimuth angle and radial frequency; (2) resampling and local averaging to convert the spectrum from polar coordinates into Cartesian coordinates, with uniform spacing in each of the two perpendicular axes; and (3) performing a two-dimensional inverse FFT to transform the spectrum back into the space domain, resulting in a cross-sectional image of the patient. The direct Fourier method provides improved computation efficiency over CBP. However, the image quality of the direct Fourier method is relatively poor due to the spectral phase error induced from the resampling process. Also, generally the direct Fourier method compatible with a parallel beam CT scanning system, and not with a fan beam CT scanning system.

The inventor of the present invention recognized the limitations of the prior art image reconstruction techniques discussed above and developed an improved technique for increasing the throughput rate of the backprojection process while maintaining image quality. The inventor, recognized that image reconstruction could be performed by fast two-dimensional Fourier circular convolution (FFCC). This backprojection process involves Fourier transform in both the radial dimension and the azimuthal dimension. By incorporating FFCC into the image reconstruction process, the number of computations may be reduced by up to 68%, while the quality of the reconstructed image is commensurate with the known CBP technique.

Further, the FFCC technique yields efficient memory access patterns when implemented on workstations or similar computer systems. The cost of the computer hardware, including memory, is typically a significant part of the cost of a CT scanning system. Based on the current trend of the rapidly decreasing cost of workstations and similar computer systems, the present invention may be implemented on a relatively cost-effective computer system. Therefore, the present invention helps reduce the cost of medical services, benefiting both the patient and provider.

Also, the inventor developed a reconstruction technique that may be implemented with both fan beam and parallel beam CT systems. Further, the image reconstruction technique of the present invention may be implemented in PET, URT, and other applications where the convolution backprojection technique may be used.

The present image reconstruction technique may be implemented in a variety of computing systems, including client/server systems. The technique may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages will become apparent from the following description, including the drawings, and from the claims.

It is, therefore, an object of the present invention to provide a system and method for reconstructing images of a cross-sectional area from raw, scanned data.

It is another object of the invention to reconstruct images by using fast two-dimensional Fourier circular convolution.

BRIEF DESCRIPTION OF THE DRAWINGS

These and other aspects of the present invention will be described in detail with respect to the accompanying drawings, in which.

DESCRIPTION OF THE PREFERRED EMBODIMENTS

In CBP, to generate each output image pixel, the back-projection computes a line integral following a line trace. This process can be expressed as the following equation for a parallel beam CT scanning system:

$$SO(x, y) = \int_0^{2\pi} SI(r\cos(\theta - \phi)) \cdot d\theta \quad (1)$$
$$= \int_0^{2\pi} SI(r') \cdot \delta(r' - r\cos(\theta - \phi)) \cdot d\theta,$$

where $SI(r)$ is the convoluted data through the first step of the CBP process, $SO(x,y)$ is the output image value for the point located at $(x,y)$, and $(r,\theta)$ is the polar coordinate representation of $(x,y)$. The scan data is assumed to be collected over a complete revolution about the patient; therefore, the range of the integral is $[0, 2\pi]$. $\delta(r'-r\cos(\theta-\phi))$ is the line trace function for the backprojection process, where $\delta$ is Dirac's delta function and $\delta(r')=1$, for $r'=0$, and $\delta(r')=0$, for $r' \neq 0$.

The line trace function is invariant in azimuth, i.e., all of the output image pixels of the same radial distance r have the same line trace function, shifted in azimuth according to the azimuth angle $\phi$ of the image pixel. If the output of the backprojection is changed from Cartesian coordinates to polar coordinates, the backprojection process can be formulated as a circular convolution process. Once the image is generated in polar coordinates, it can then be converted into Cartesian coordinates by a resampling process. Since the resampling is applied in the image domain instead of the spectral domain, the image quality degradation that is commonly found in the direct Fourier method will not occur in the present invention.

A circular convolution process for the backprojection can be formulated in discrete form as:

$$SO_m(j) = \sum_{j'=1}^{N} \sum_{i=1}^{M} SI(j-j', i) \cdot T_m(j', i) \quad \text{for } j = 1, 2, \ldots, N, \quad (2)$$

where $SI(j-j',i)$ is the input data, $SO_m(j)$ is the m-th output image ring, j is the azimuth angle or view index, and i is the sensor index. It should be noted that both $SI(j-j',i)$ and $SO_m(j)$ are periodic functions of j with a period of N, and where M is the total number of sensors. $T_m(j',i)$ is the line trace function corresponding to a target located at polar coordinate $((m-1)\cdot\Delta r, 0)$, where $\Delta r$ is the minimal radial spacing between two adjacent sensors. For a bandwidth limited discrete signal, $T_m(j',i)$ is given by the following general form:

$$T_m(j', i) = \frac{\sin(\pi((i - M/2 - 1) - i1(j')))}{\pi((i - M/2 - 1) - i1(j'))}. \quad (3)$$

For a parallel beam system, $i1(j')$ is given by $$i1(j') = (m-1) \cdot \cos\left(\frac{2\pi \cdot j'}{N}\right).$$

Figure 2:
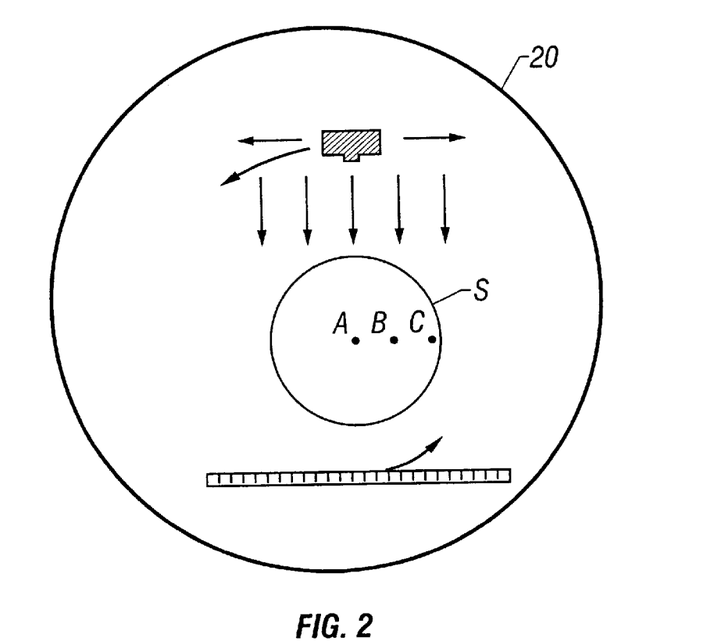
FIG. 2 is a block diagram of a CT scanner and several points in a subject to be scanned.
Figure 3A:
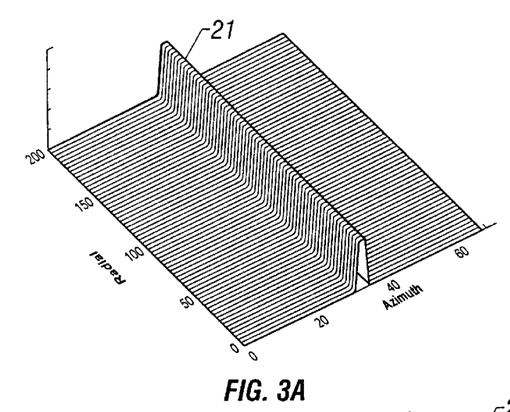
FIGS. 3A–C are graphical representations of line trace functions from scanned points.
Figure 3B:
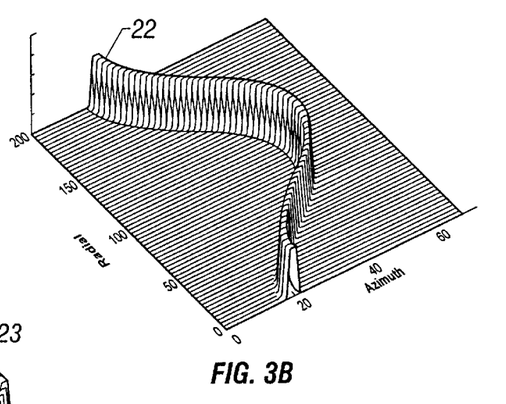
Figure 3C:
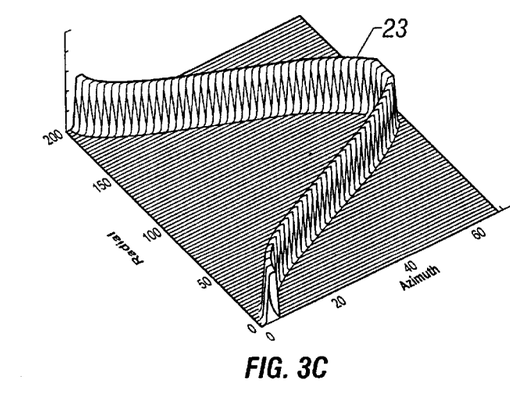

FIG. 2 shows a block diagram of a parallel beam CT scanner system 20 and a subject S, with three points, A, B, and C, within the subject. FIGS. 3A–C show the respective line trace functions 21, 22, 23, of points A, B, and C.

A one-dimensional convolution is implemented using a fast Fourier correlation method to enhance the throughput rate. The key to the throughput rate enhancement is the use of the FFT process. Implementing equation (1) using the fast Fourier approach includes four steps: (1) performing a two-dimensional FFT for both $SI(j,i)$ and $T_m(j',i)$; (2) multiplying the spectrum of $SI(j,i)$ with the complex conjugate of the spectrum of $T_m(j', i)$ to get a composite spectrum; (3) averaging the composite spectrum in the radial direction; and (4) performing an inverse FFT to get one image line, i.e., a ring of the cross-sectional image around the center of revolution. This process is referred to as the fast two-dimensional Fourier circular convolution (FFCC).

The amount of computation is significantly less than it may appear in these four steps for the following reasons: (1) the two-dimensional FFT for $T_m(j',i)$ can be saved if its spectrum is pre-computed and stored; (2) the two-dimensional FFT for $SI(j,i)$ is required only once to process all image rings; (3) the value of any point in the spectrum of $T_m(j',i)$ is the complex conjugate of its opposite point with respect to the origin of the spectrum, therefore, only one half of the spectrum needs to be multiplied for generating the composite spectrum; (4) within a half plane of the spectrum, values of a large percentage of points are close to zero and, therefore, may be ignored; and (5) the FFT in the radial direction for SI(j,i) can be saved if the convolution process that precedes the backprojection is also performed in the Fourier domain.

Figure 4A:
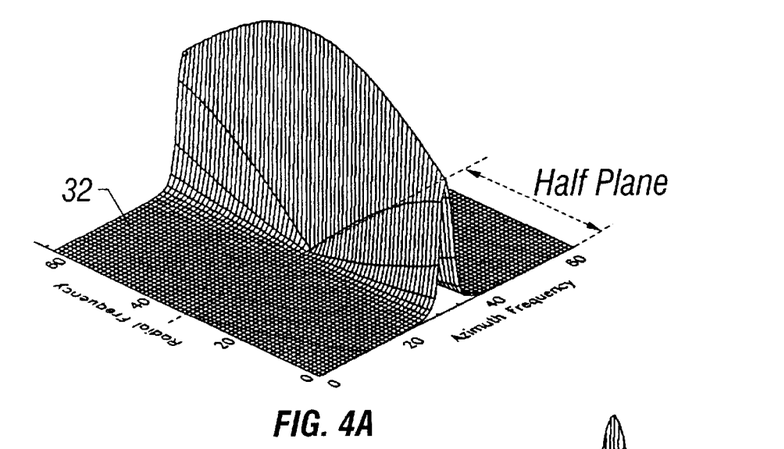
FIGS. 4A–C are graphical representations of the two-dimensional spectra of the scanned points.
Figure 4B:
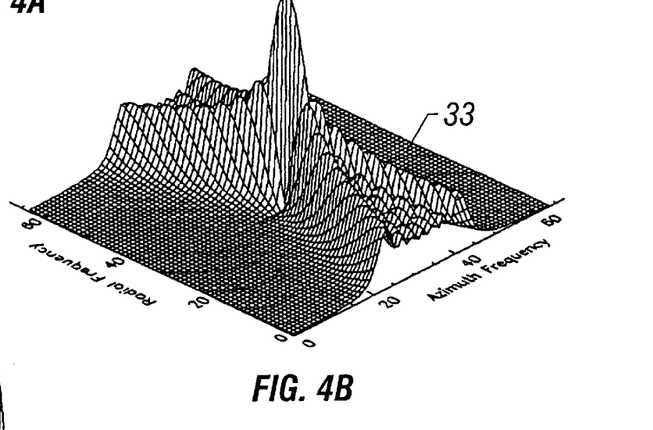
Figure 4C:
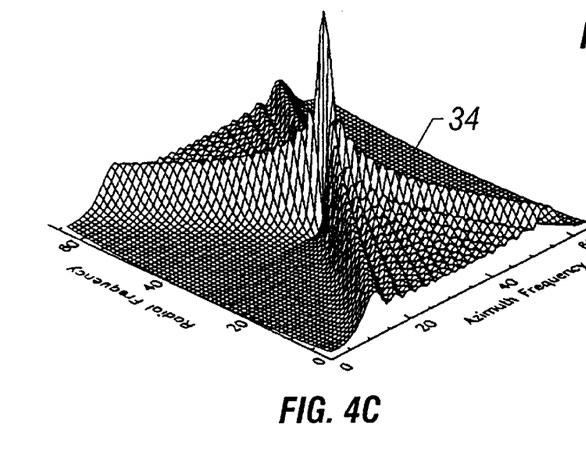

Reasons (3) and (4) together may reduce the number of complex multiplies for computing the composite spectrum by up to 87.5 percent. FIGS. 4A–C show the respective two-dimensional spectra 32, 33, 34, of points A, B, and C shown in FIG. 2. FIGS. 4A–C show both the half-plane symmetry of the respective spectra, and also the large percentage of points close to zero. A continuous form of the composite spectrum $T_m(j',i)$ may be formulated as $$T_m(\theta, r) = \frac{\sin(\pi(r/\Delta r - (m-1)\cdot\cos\theta))}{\pi(r/\Delta r - (m-1)\cdot\cos\theta)}. \quad (4)$$

The Fourier transform along the radial dimension yields $$F_r\{T_m(\theta,r)\} = \exp\{-J\cdot2\pi\cdot R\cdot(m-1)\cdot\Delta r\cdot\cos\theta\}, \text{ where } J^2 = -1, \quad (5)$$

and where R is the spatial frequency of the radial dimension. The range of R is $[0, 1/\Delta r]$ for this frequency modulation function.

In order to obtain the analytical solution for the Fourier transform of equation (5) in the azimuth direction, one may use the principle of stationary phase (e.g., as shown in on page 3.5, Radar Handbook, by Skolnik). However, to examine the range of azimuth spatial frequency of the signal in equation (5), one may differentiate the phase term in the exponent to yield $$\Theta = \frac{1}{2\pi}\cdot\frac{d}{d\theta}(2\pi\cdot R\cdot(m-1)\cdot\Delta r\cdot\cos\theta) \quad (6)$$

$$\Theta = -R\cdot(m-1)\cdot\Delta r\cdot\sin\theta$$

Therefore, the range of $\Theta$ of this FM signal is $[-R\cdot(m-1)\cdot\Delta r, R\cdot(m-1)\cdot\Delta r]$. It can be shown that the maximum sampling spacing in azimuth without aliasing is 2/M−1 radians. Therefore, the total range of $\Theta$ $$-\frac{M-1}{2}, \frac{M-1}{2}.$$

Since $m-1 \leq M-1$ and $R\cdot\Delta r \leq 1$, the two-dimensional spectrum of $T_m(\theta,r)$ or $T_m(j',i)$ covers only a fraction for the entire spectral space. Hence, the shape of the two-dimensional frequency domain mask is triangular. A similar analysis, yielding similar results, may be applied to a fan beam system.

The number of floating point operations (FLOPs) is a measurement often used in comparing the efficiency among different image-generating processes. A floating point operation includes two basic operations, add and multiply. Table 1 shows the number of FLOPs required for accomplishing the backprojection process using both the line integral approach and the FFCC approach of the present invention. For the purposes of the comparison shown in Table 1, it is assumed that the raw data is from a fan beam CT system making a complete revolution about the patient. The FFCC technique is faster than the CBP line integral technique by a factor approaching π when the number of views is very large. In addition, using the CBP line integral approach, one must perform an interpolation prior to integration in order to reduce the sample spacing in the radial direction. This additional interpolation step will further increase the total number of FLOPs required in the line integral technique.

TABLE 1

| Processing Algorithm | Line Integral | Fast Fourier Cicular Convolution |
| --- | --- | --- |
| No. of FLOPs Required | $\frac{N^3}{2\pi}$ | $\frac{N^3}{2\pi^2} + \left(\frac{4}{\pi} + \frac{3}{32}\log_2 N\right)N^2$ | where N = numbers of views

In order to optimally integrate the FFCC into the image reconstruction process, two other issues may be considered. In a parallel beam system, the raw scan data of a complete revolution has enough information for generating two independent full-resolution images of the same cross-section. Averaging these two images results in an image with improved quality due to the enhanced the signal-to-noise ratio. This averaging process is referred to as look averaging. The resultant image is referred to as a multi-look image. The look-averaging process may also be performed in the raw data domain to order to reduce the amount of computation.

Also, a rebin process may be applied to the raw data of a fan beam system to change its sample position in azimuth such that the resultant transmission profile resembles that viewed from a parallel beam system. Therefore, as disclosed below, the present invention may be implemented in various embodiments.

Figure 5:
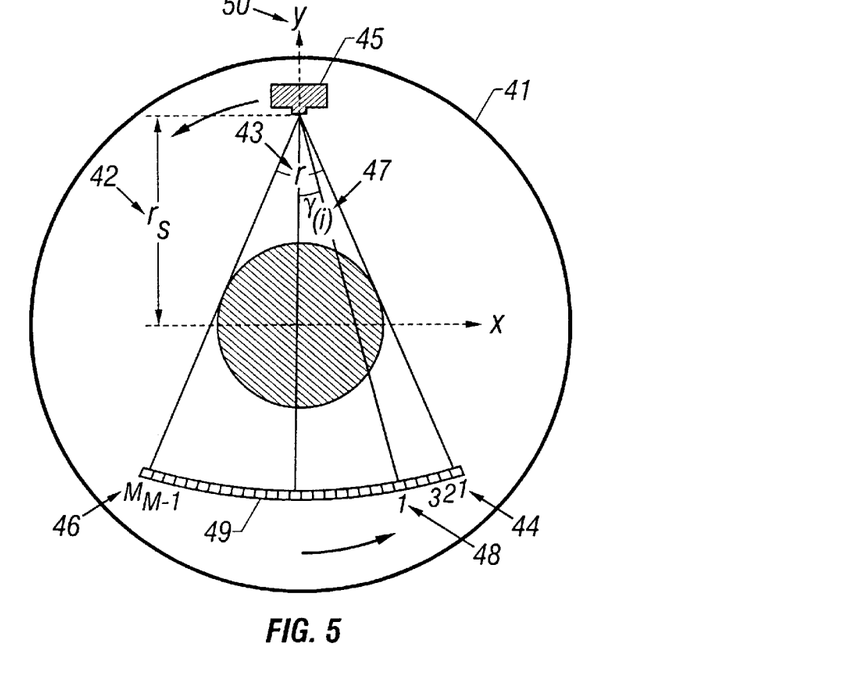
FIG. 5 is a block diagram of a third-generation CT scanner.
Figure 6:
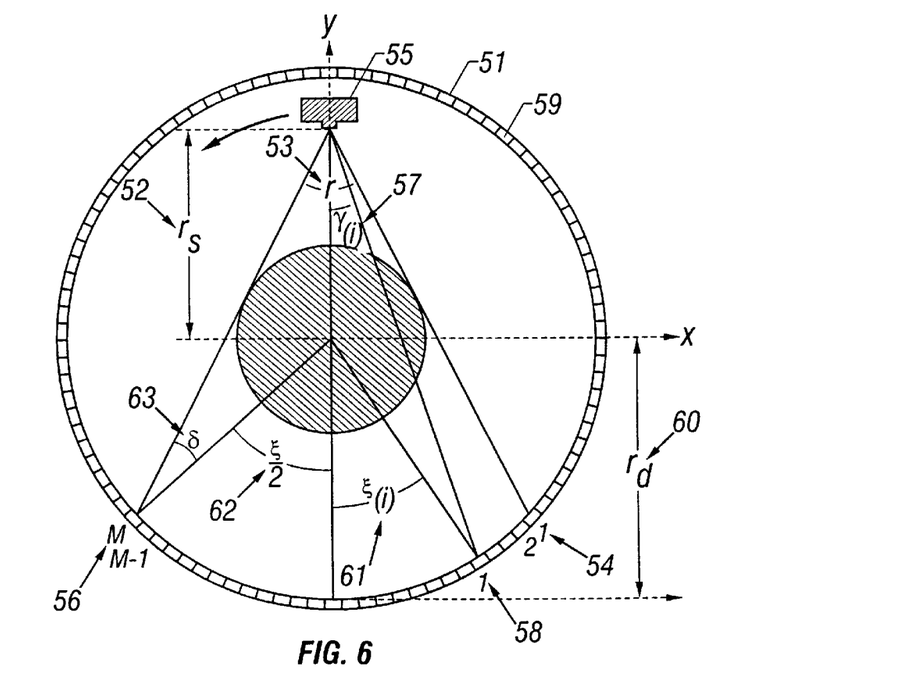
FIG. 6 is a block diagram of a fourth-generation CT scanner.

A third generation CT system 41 and a fourth generation CT system 51 are shown in FIGS. 5 and 6, respectively. The radius of the x-ray source is $r_s$ 42, 52, respectively. The fan angle Γ 43, 53 is the angle between the first sensor 44, 54, the x-ray source 45, 55, and M-th sensor 46, 56, respectively. The detector angle γ(i) 47, 57 is the angle between the i-th sensor 48, 58, the x-ray source 45, 55, and the center of the sensor array, respectively.

In the third generation CT system 41, the sensors 49 revolve synchronously with the x-ray source 45. The total number of sensors is denoted as M. In the fourth generation CT system 51, the sensors 59 are fixed to a circular structure with a radius of $r_d$ 60. The total number of sensors per view is denoted as M.

In a third generation CT system 41, with all the sensors 49 equally spaced in the x dimension, the detector angle γ(i) 47 is given by $$\gamma(i) = \tan^{-1}\left(\frac{r_s\cdot\tan(\Gamma/2) + \Delta r(1-i)}{r_s}\right), \text{ where } \Delta r = \frac{2\cdot r_s\cdot\tan(\Gamma/2)}{(M-1)}. \quad (7)$$

In a third generation CT system 41 with all the sensors 49 being equi-angular with respect to the x-ray source 45, the detector angle γ(i) 47 is given by $$\gamma(i) = \frac{\Gamma}{2} - \frac{(i-1)\cdot\Gamma}{M-1}. \quad (8)$$

In a fourth generation CT system 51, the detector angle γ(i) 57 is given by $$\gamma(i) = \tan^{-1}\left(\frac{r_d\sin(\zeta(i))}{r_s + r_d\cos(\zeta(i))}\right), \text{ with } \xi(i) = \frac{(1-i)\zeta}{(M-1)} + \frac{\zeta}{2}, \quad (9)$$

where $$\frac{\zeta}{2} = \frac{\Gamma}{2} + \delta,$$

and $\delta=\sin^{-1}(r_s/r_d \cdot \sin(\Gamma/2))$. The three angles $\xi(i)$ 61, $\xi/2$ 62, and $\delta$ 63 are shown in FIG. 6.

In general, the number of azimuth data points, N, observed over a complete revolution about the patient can be any integer number. However, in order to use FFT in image reconstruction, the number of azimuth data points, over a complete revolution, must be a product of prime numbers, i.e., $N=p_1 p_2 \ldots p_v$. In the radial direction, the number of data samples is the number of sensors. In order to apply FFT along the radial direction, zero padding may be used to change the size of M to be a product of prime numbers.

In the following description, a two-dimensional data set is represented by a matrix and is denoted as a capital letter in bold type. A one-dimensional data set is represented by a vector and is denoted as a letter capped with a "⇀" sign. For example, a matrix A with N rows and M columns is $$A = \begin{bmatrix} a_{11} & a_{12} & a_{13} & \ldots & a_{1M} \\ a_{21} & a_{22} & a_{23} & \ldots & a_{2M} \\ a_{31} & a_{32} & a_{33} & \ldots & a_{3M} \\ \vdots & \vdots & \vdots & \ddots & \vdots \\ a_{N1} & a_{N2} & a_{N3} & \ldots & a_{NM} \end{bmatrix} = [a_{ji}]_{j=1,2,\ldots,N, i=1,2,\ldots,M}, \quad (10)$$

$$\text{or } A = \begin{bmatrix} \vec{A}_1 \\ \vec{A}_2 \\ \vec{A}_3 \\ \vdots \\ \vec{A}_N \end{bmatrix},$$

where $\vec{A}_j$, the i-th vector of A, is given by $$\vec{A}_j = [a_{j1}\ a_{j2}\ a_{j3}\ \ldots\ a_{jM}] = [a_{ji}]_{i=1,2,\ldots,M}. \quad (11)$$

The element product, denoted as "·", of two matrices A and B of the same dimension is defined as $$A \cdot B = [c_{ji}]_{j=1,2,\ldots,N,\ i=1,2,\ldots,M},$$

where $$c_{ji} = a_{ji} \cdot b_{ji}. \quad (12)$$

The element product of two vectors can be defined in a manner similar to equation (9). The one-dimensional FFT of the first K vectors of A is given by $$FFT_K[A] = \begin{bmatrix} FFT[\vec{A}_1] \\ FFT[\vec{A}_2] \\ FFT[\vec{A}_3] \\ \vdots \\ FFT[\vec{A}_K] \end{bmatrix}, \quad (13)$$

where $FFT[\vec{A}_j] = [\hat{a}_{j1}\ \hat{a}_{j2}, \ldots, \hat{a}_{jM}]$, and $$\hat{a}_{jh} = \sum_{i=1}^{M} a_{ji} \cdot e^{-J \cdot 2\pi(i \cdot h)/M}, h = 1, 2, \ldots, M, \quad (14)$$

where $J^2=-1$. The transpose of a matrix A is given by $$T[A] = [a_{ij}]_{i=1,2,\ldots,M,\ j=1,2,\ldots,N}. \quad (15)$$

For the purposes of the following description, it is assumed that: (1) the initial x-ray source is in the positive y axis 50 (shown in FIG. 5); (2) M is an odd number and the center x-ray beam illuminates the center sensor, i.e., the M/2+1-th S sensor; and (3) each CT data set is taken over a complete revolution about the patient. Also, it is assumed that the input data has been preprocessed by taking the logarithmic value and by removing the bias and scaling error. These preprocessing steps may be accomplished by known techniques.

First Embodiment

Figure 7:
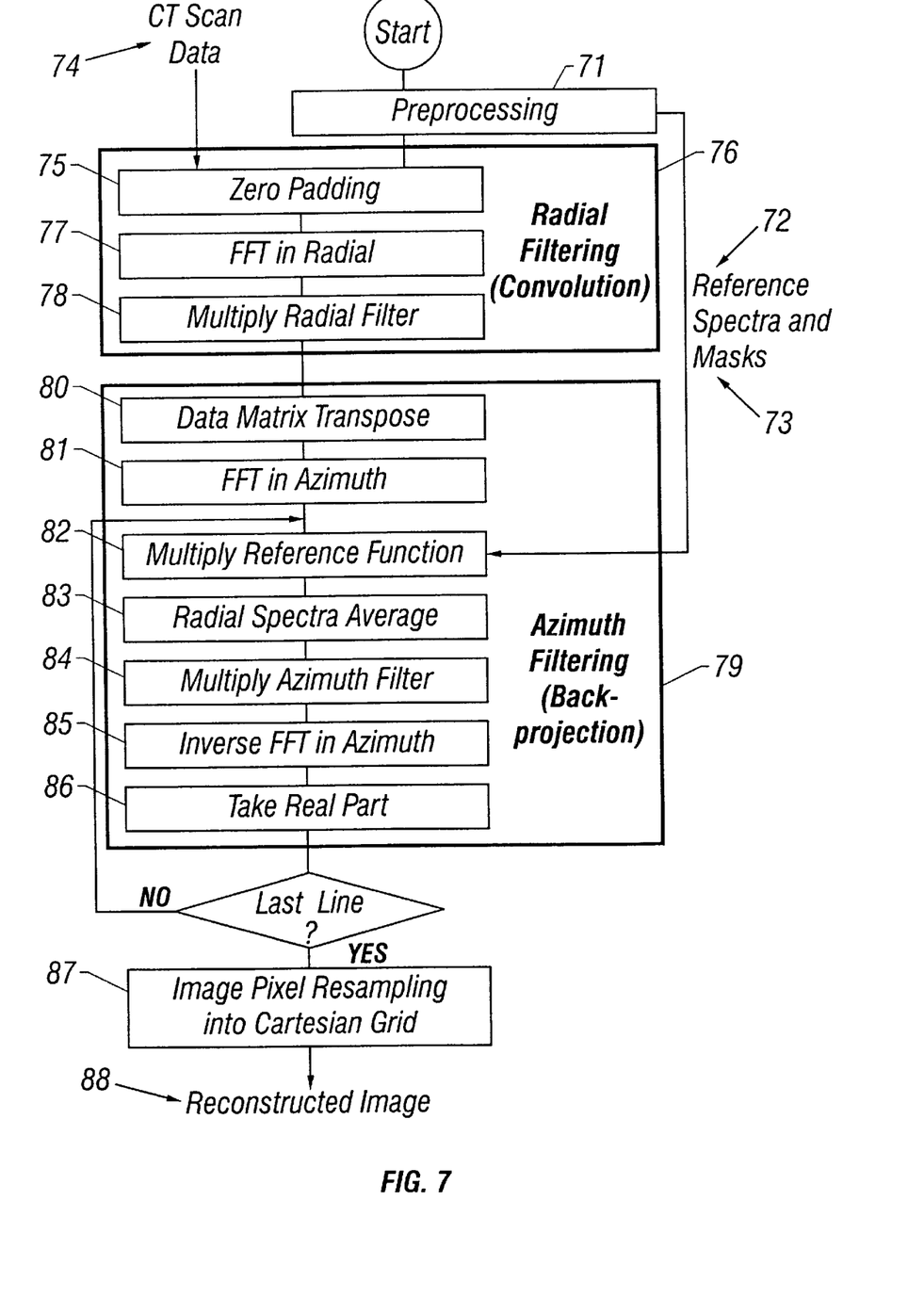
FIG. 7 is a flow diagram of an embodiment of the image reconstruction process of the present invention.

A flow diagram of a first embodiment of the present invention is shown in FIG. 7. The image reconstruction process includes five steps: (1) preprocessing 71 to generate the reference spectra 72 and their mask functions 73; (2) zero padding the CT data 74 in the radial direction 75; (3) starting image reconstruction by first performing a filtering 76 in the radial direction; (4) performing a fast Fourier circular convolution 79, where the output of this step is the reconstructed image in polar coordinates; and (5) performing an interpolation process 87 to convert the reconstructed image from polar coordinates into Cartesian coordinates. To process several CT data sets 74, only steps (2) through (5) are performed for each data set, i.e., there is no need to repeat step (1) for each data set.

In step (1), M/2+1 sets of two-dimensional spectra 72 and masks 73 are generated to be used in the FFCC described in step (4). The spectra 72 are the two-dimensional FFT results of point targets. Let Pm represent the line trace function of a point target located at ((m−1)·Δr, 0) in polar coordinates, where Δr is the minimum spacing along the x-axis between two adjacent sensors. Pm covers a 360° view range and consists of the target response from detector 1 through detector M. The analytical expression of Pm is obtained from the angle of the point target at each view and the sensor angles $\{\gamma(i), i=1,2,\ldots,M\}$, determined either from equations (7), (8), and (9), or from calibration measurements.

Generating each reference spectrum includes: (i) zero padding to the last sample of each view of Pm to change the radial dimension from M to M3, where M3 is the product of prime numbers; (ii) performing a one-dimensional (1-D) FFT along the radial direction for all vectors in Pm; (iii) performing a data matrix transpose process; and (iv) performing a 1-D FFT along the azimuth direction for the first M3/2+1 vectors in the resultant matrix. The resultant spectrum for the m-th point target is denoted as P2m.

The mask functions, denoted as MKm for the m-th spectrum, can be expressed analytically based upon the energy distribution of the spectrum and a given threshold value. Each point of MKm is either 1, when the energy at that point is no less than the threshold value, or 0, when the energy at that point is less than the threshold value. Several known techniques may be used to select the threshold value. In one embodiment, the threshold value is given by a certain percentage, ranging from 1% to 10% as selected by the user, of the peak magnitude value of the reference spectra.

Another method of defining the mask is by specifying the mask boundaries using straight lines, as described below.

In step (2), zero padding 75 is performed to the last sample to change the radial dimension into a number, M3, that is the product of prime numbers. Zero padding also creates a gap between the first and the last data samples in the radial direction, preventing signal leakage from one end to the other during a circular convolution process. Let the input CT data 74 be represented by $S1=[s1_{ji}]_{i=1,2,\ldots,M,\ j=1,2,\ldots,N}$, and the output of the zero-padding process be represented by S1A, where $S1A=[s1A_{ji}]_{i=1,2,\ldots,M3,\ j=1,2,\ldots,N}$. S1A is related to the input data S1 by $$S1A_{ji} = S1_{ji} \text{ for } 1 \le i \le M \qquad (16)$$
$$= 0, \text{ for } M+1 \le i \le M3.$$

Step (3) includes (i) performing a 1-D FFT 77 along the radial direction, and (ii) multiplying 78 the spectral data with a radial filtering function. Let the output of this processing step be represented by S2, where $S2=[s2_{ji}]_{i=1,2,\ldots,M3,\ j=1,2,\ldots,N}$. S2 is related to the input data S1A by $$S2=FFT_N\{S1A\}\cdot WR, \qquad (17)$$

where WR is the radial filtering function. This function is given by the product of a ramp function and a one-dimensional window function, as shown in the following equation:

$$WR_{ji} = (i-1)\cdot WD(i), \text{ for } 1 \le i \le M3/2 \qquad (18)$$
$$= |i - M3 - 1|\cdot WD(i), \text{ for } M3/2+1 \le i \le M3$$

The window function is used to shape the impulse response of the reconstructed image.

Step (4), the FFCC step, includes: (i) performing a matrix transpose 80, (ii) performing a 1-D FFT 81 along the azimuth direction, and (iii) performing a do loop of reference spectra multiply 82, averaging 83 in the radial direction, multiplying azimuth weighting filter 84, performing an inverse azimuth FFT 85, and taking the real part 86 of the output data. This results in a tomography image in polar coordinates. The length of the do loop is M/2+1. The output data after spectral multiply 82 is given by $$S3m_{ji}=S3_{ji} \text{ for } MKm_{ji}=1,$$
$$S3m_{ji}=0 \text{ for } MKm_{ji}=0,$$
$$\text{where } S3=FFT_{M3/2+1}\{T\{S2\}\}\cdot P2m^*, \qquad (19)$$

where * stands for the complex conjugate operation. The averaging 83 in the radial spectral dimension for S3m can be expressed as $$S4m_j = \sum_{i=1}^{M3/2+1} S3m_{ij} \qquad \text{for } j=1 \text{ or } N/2+1, \qquad (20)$$

$$= \sum_{i=1}^{M3/2+1} S3m_{ij} + \sum_{i=1}^{M3/2} S3m^*_{i,N-j+2} \quad \text{for } j=2,\ldots,N/2,$$

$$= S4m^*_{N-j+2} \qquad \text{for } j=N/2+2,\ldots,N.$$

The output data of inverse FFT process 85 consists of one image line representing the image of targets at a distance of $(m-1)\cdot\Delta r$ from the center of the revolution. This one-dimensional image data is given by $$S\vec{5}m = Scm\cdot Re\ al\{FFT\{S\vec{4}m\cdot W\vec{A}m\}\}, \qquad (21)$$

where Scm is a calibration scale factor applied to the $^m$-th image line, and $W\vec{A}m$ is the weighting function designed for $^m$-th image line. After the do loop is completed, there are M/2+1 image lines. These images lines represent the reconstructed image in polar coordinates. Let this two-dimensional data be denoted as S5 and $S5=[S5_{mj}]_{m=1,2,\ldots,M/2+1,\ j=1,2,\ldots,N}$.

Step (5) includes a resampling process 87 to convert the tomography image from polar coordinates into Cartesian coordinates. The resampling process may be accomplished by the interpolation process described below.

Second Embodiment

Figure 8:
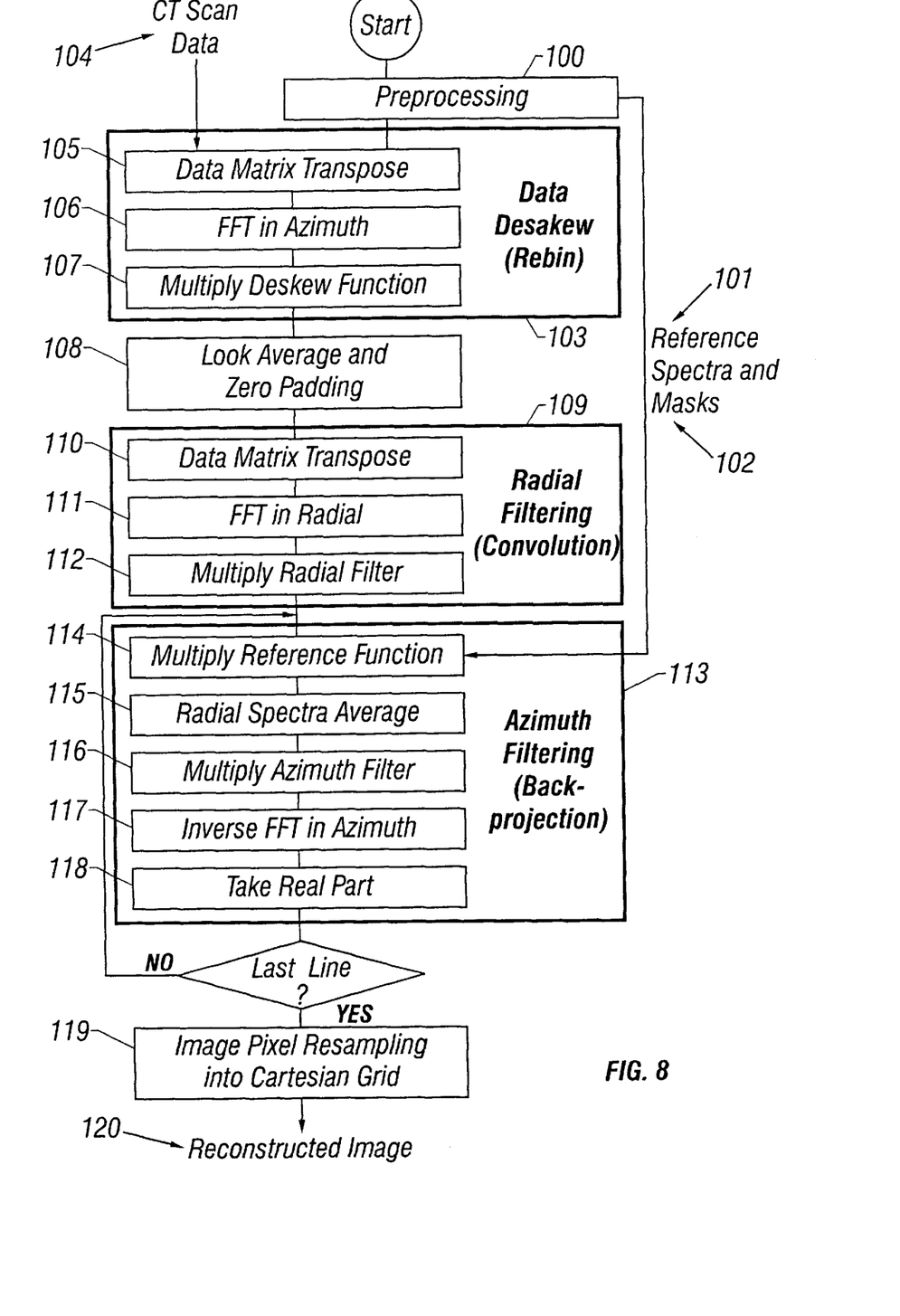
FIG. 8 is a flow diagram of an embodiment of the image reconstruction process of the present invention.

A flow diagram of a second embodiment, for a fan beam CT system, is shown in FIG. 8. In this embodiment, the image reconstruction process includes the following six steps: (1) preprocessing 100 to generate the reference spectra 101 and their mask functions 102; (2) starting the image reconstruction process by first performing a data deskew 103 in the frequency domain to modify the input data 104 so that this data resembles the data that would be obtained from a parallel beam CT system; (3) performing look averaging and zero padding 108; (4) filtering 109 in the radial direction; (5) performing a FFCC 113, where the output of this step is the reconstructed image in polar coordinates; and (6) interpolating 119 to convert the reconstructed image from polar coordinates into Cartesian coordinates. To process several CT data sets 104, only steps (2) through (6) are performed for each data set, i.e., there is no need to repeat step (1) for each data set.

In step (1), M/2+1 sets of mask functions 102 and two-dimensional spectra 101 are generated to be used as reference spectra in the FFCC process described in step (5). The spectra represent the deskewed and Fourier transformed results of point target line trace function of a fan beam system. Let Pm represent the line trace function of a point target located at $((m-1)\cdot\Delta r, 0)$ in polar coordinates, where $\Delta r$ is the minimum sensor spacing along the x dimension. $\Delta r$ is given by $\Delta r=r_s\cdot \text{Min}\{\tan(\gamma(i+1))-\tan(\gamma(i)), \text{ for } i=1,2,\ldots, M/2+1\}$.

The $^m$ th point target line trace function, Pm, of a fan beam system can be expressed as $$Pm_{j,i} = \frac{\sin(2\pi(i-ai(j)))}{2\pi(i-ai(j))}, i= \qquad (22)$$
$$1,2,\ldots, M/2+M1, \text{ and } j=1,2,\ldots,N,$$

where ai(j)=i0(j)+di(j), i0(j) is an integer determined by $\gamma(i0(j))\le\gamma 1<\gamma(i0(j)+1)$, di(j) is a fractional number given by $$di(j) = \frac{\gamma 1 - \gamma(i0(j))}{\gamma(i0(j)+1) - \gamma(i0(j))},$$

and $\gamma 1$ is the target sensing angle given by $$\gamma 1 = \tan^{-1}\left(\frac{(m-1)\cdot \Delta r \cdot \sin(\theta(j))}{r_s - (m-1)\cdot \Delta r \cdot \cos(\theta(j))}\right), \quad (23)$$

$$\text{where } \theta(j) = \text{sign} \cdot (j-1) \cdot \frac{2\pi}{N}.$$

Pm covers a 360° view range and consists of the target response from detector 1 through detector M/2+M1+1, representing a one-look response with M1 extra data in order to obtain a more accurate image from FFCC. A typical value for M1 is 10.

In equation (23), the sign of $\theta(j)$ is equal to either +1 when the x-ray source rotates counterclockwise or −1 when the x-ray source rotates clockwise. Generating reference functions from the point target line trace function includes: (i) performing a data matrix transpose process, (ii) performing a 1-D FFT along the azimuth direction, (iii) multiplying the spectral data with a deskewing function, (iv) data truncating, shifting, and zero padding, (v) performing a data matrix transpose process, and (vi) performing a 1-D FFT along the radial direction. Let the output from step (iii) be represented by P1m, where P1m=[P1m$_{ji}$]$_{j=1,2,\ldots,N,\ i=1,2,\ldots,M/2+M1+1}$. P1m is related to Pm by $$P1m = FFT_{M/2+M1+1}\{T\{Pm\}\} \cdot D, \quad (24)$$

where D is the deskewing function given by $$D_{ji} = e^{J \cdot \text{sign} \cdot \gamma(i) \cdot j}, \text{ where } J^2 = -1. \quad (25)$$

Let P2m be the output from step (iv). P2m can be expressed as $$P2m_{ij} = P1m_{ij} \text{ for } 1 \le i \le M1 + M/2 + 1 \quad (26)$$

$$= 0, \text{ for } M1 + M/2 + 1 < i \le M1 + M2 + M/2 + 1.$$

The matrix P2m has M3 elements in the radial direction, where M3=M1+M2+M/2+1, and N elements in the azimuth direction. M2 is a value chosen so that M3 is a product of prime numbers. Let P3m be the output from step (vi). P3m can be expressed as $$P3m = FFT_{N/2+1}\{T\{P2m\}\}. \quad (27)$$

The mask function 102 is also used in processing step (5) to reduce the number of multiplies in that process. The mth mask function $^M$Km is given by $$Mkm_{ji} = 1, \text{ for } j \le 2\pi\frac{(i-1)\cdot(m-1)}{M3} \text{ and } 1 \le i \le M3/2 + 1 \quad (28)$$

$$= 1, \text{ for } j \le \pi M - 2\pi\frac{(i-1)\cdot(m-1)}{M3} \text{ and } M3/2 + 1 < i \le M3$$

$$= 0, \text{ otherwise.}$$

Step (2) includes (i) performing a data matrix transpose process 105, (ii) performing a 1-D FFT 106 along the azimuth direction, and (iii) multiplying 107 the spectral data with a deskewing function to convert the spectrum from a fan beam to a parallel beam. Let the input CT data set 104 be represented by S1=[s1$_{ji}$]$_{i=1,2,\ldots,M,\ j=1,2,\ldots,N}$ and the output data be represented by S2, where S2=[s2$_{ij}$]$_{j=1,2,\ldots,N,\ i=1,2,\ldots,M}$. S2 is related to S1 by $$S2 \ FFT_M\{T\{S1\}\} \cdot D, \quad (29)$$

where D is the deskewing function given in equation (25).

In step (3), look averaging and zero padding 108 are performed. Let S2A be the output matrix. S2A is given by $$S2A_{ij} = (S2_{i,j}) + (S2_{M-i+1,j}) \cdot e^{-J\cdot \pi \cdot j} \text{ for } \le i \le M1 + M/2 + 1 \quad (30)$$

$$= 0, \text{ for } M1 + M/2 + 1 < i \le M1 + M2 + M/2 + 1.$$

Step (4) includes (i) performing a data matrix transpose process 110, (ii) performing a 1-D FFT 111 along the radial direction, and (iii) multiplying 112 the spectral data with a radial filtering function. Let the output of this step be represented by S3=[s3$_{ji}$]i=1,2, ... , M 3, j=1,2, ... , N/2+1. S3 is related to S2A by $$S3 = FFT_{N/2+1}\{T\{S2A\}\} \cdot WR, \quad (31)$$

where WR is the radial filtering function. This function is given by the product of a ramp function and a one-dimensional window function, as shown in the following equation:

$$WR_{ji} = (i-1)\cdot WD(i), \text{ for } 1 \le i \le M3/2 \quad (32)$$

$$= |i - M3 - 1| \cdot WD(i), \text{ for } M3/2 + 1 \le i \le M3$$

The window function serves to shape the impulse response of the reconstructed image.

Step (5) involves performing a do loop of reference function multiply 114, averaging 115 in the radial spectral dimension, multiplying azimuth weighted filter 116, performing an inverse FFT 117 along the azimuth direction, and taking the real part 118 of the output data. This results in a tomography image in polar coordinates. The length of the do loop is M/2+1. The output data after spectral multiply is given by $$S4m_{ji} = S4_{ji} \text{ for } Mkm_{ji} = 1,$$

$$S4m_{ji} = 0 \text{ for } Mkm_{ji} = 0,$$

$$\text{where } S4 = S3 \cdot P3m^*, \quad (33)$$

where * stands for the complex conjugate operation. The averaging in the radial spectral dimension for S4m can be expressed as $$S5m_j = \sum_{i=1}^{M3} S4m_{ij} \text{ for } j = 1, 2, \ldots, N/2+1 \quad (34)$$

$$= S5m^*_{N-j+2} \text{ for } j = N/2+2, \ldots, N$$

After performing an inverse FFT 117 along the azimuth direction and taking the real part 118 of each vector element, the output data of this step is one image line representing the image of targets at a distance of $(m-1)\cdot \Delta r$ to the center of revolution. This one-dimensional image data is given by $$\vec{S6}m = Scm \cdot Re \ al\{FFT\{\vec{S5}m \cdot WAm\}\}, \quad (35)$$

where Scm is a calibration scale factor applied to the m-th image line, and $\vec{WA}m$ is the weighting function designed for m-th image line. After the do loop is completed, there are M/2+1 image lines. These images lines represent the reconstructed image in polar coordinates. Let this two-dimensional data be denoted as S6 and $S6=[S6_{mj}]_{m=1,2,\ldots,M/2+1, j=1,2,\ldots,N}$.

Step (6) includes performing a resampling process 119 to convert the tomography image from polar coordinates into Cartesian coordinates. Let x and y represent the index of horizontal and vertical direction of the Cartesian grid, respectively, and the sampling spacing of this grid is $\Delta r$. The center of this Cartesian grid is given by (M/2+1, M/2+1). The polar coordinates of (x,y) are given by (r(x,y), $\theta$(x,y)), where $r(x,y)=\Delta r \cdot \sqrt{(x-M/2-1)^2+(y-M/2-1)^2}$ and $\theta(x,y)=\tan^{-1}(y-M/2-1, x-M/2-1)$. The image value at (x,y) where $r(x,y) \leq M/2 \cdot \Delta r$ is given by the weighted sum of $S6_{mj}$, i.e., $$S7_{xy} = \sum_{i=1-\frac{N_p}{2}+1}^{N_p/2} \sum_{m=1-\frac{N_p}{2}+1}^{N_p/2} W(m-m0, j-j0) \cdot S6_{m0+m, j0+j} \quad (36)$$

where $$m0 = int\left(\frac{r(x,y)}{\Delta r}\right)+1 \text{ and } j0 = int\left(Mod\left(\frac{N \cdot \theta(x,y)}{2\pi}+N, N\right)\right) \quad (37)$$

$N_p$ is the number of points involved in this interpolation process in each direction, and $W(m-m0, j-j0)$ is the interpolator weight coefficient.

Third Embodiment

Figure 9:
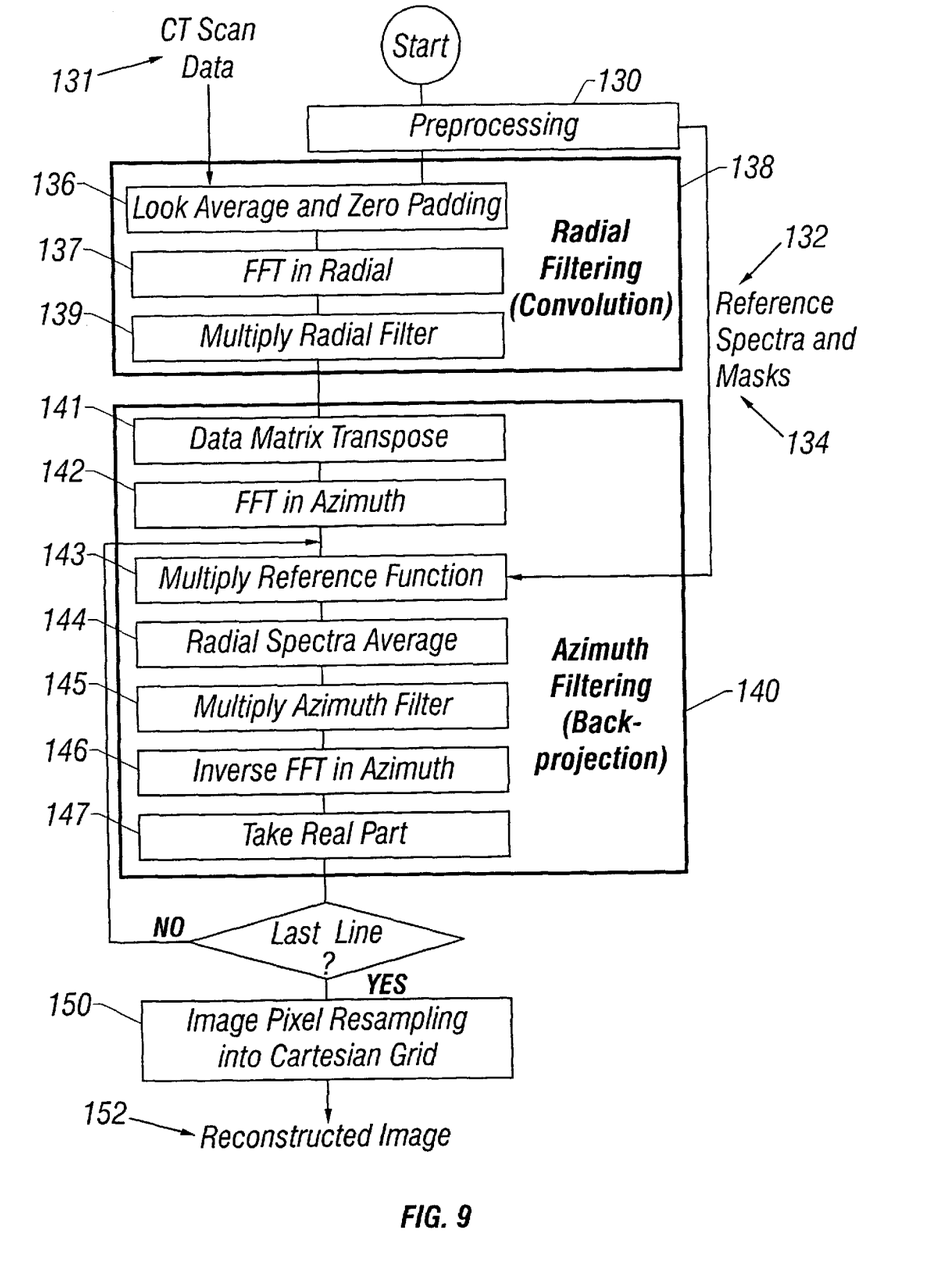
FIG. 9 is a flow diagram of an embodiment of the image reconstruction process of the present invention.

A flow diagram of another embodiment, for a parallel beam CT system, is shown in FIG. 9. In this embodiment, the image reconstruction process includes five steps: (1) preprocessing 130 to generate the reference spectra 132 and their mask functions 134; (2) performing look averaging in the radial direction and zero padding data 136; (3) starting the image reconstruction process by first performing a filtering 138 in the radial direction; (4) performing a FFCC 140, where the output of this step is the reconstructed image in polar coordinates; and (5) performing an interpolation process 150 to convert the reconstructed image from polar coordinates into Cartesian coordinates. To process several CT data sets 131, only steps (2) through (5) are performed for each data set, i.e., there is no need to repeat step (1) for each data set.

In step (1), M/2+1 sets of two-dimensional spectra 132 and masks 134 are generated to be used in the FFCC 140 described in step (4). These spectra represent the Fourier transformed results of point target line trace functions of a parallel beam system. Let Pm represent the line trace function of a point target located at ((m−1)·$\Delta$r, 0) in polar coordinates, where $\Delta$r is the spacing between two sensors. The $^m$ th point target line trace function Pm can be expressed as $$Pm_{j,i} = \frac{\sin(2\pi((i-M/2-1)-(m-1)\cdot\cos(\theta(j))))}{2\pi((i-M/2-1)-(m-1)\cdot\cos(\theta(j)))}, \quad (38)$$

where $\theta(j) = \text{sign} \cdot (j-1) \cdot \frac{2\pi}{N}$ for $i = 1, 2, \ldots, \frac{M}{2}+M1+1$, and $j = 1, 2, \ldots, N$.

In equation (38) the sign of $\theta$(j) is equal to either +1 when the x-ray source rotates counterclockwise or −1 when the x-ray source rotates clockwise. Generating reference spectra from the point target line trace function includes: (i) data truncating, shifting, and zero padding, (ii) performing a 1-D FFT along the radial direction, (iii) performing a data matrix transpose process, and (iv) performing a 1-D FFT along the azimuth direction. Let P1m be the output from step (i). P1m can be expressed as $$P1m_{ji} = Pm_{j,i}, \text{ for } 1 < i \leq M1+M/2+1, \quad (39)$$

$$= 0, \text{ for } M1+M/2+1 < i \leq M1+M2+M/2+1.$$

The matrix P1m has A3 elements in the radial direction, where M3=M1+M2+M/2+1, and N elements in the azimuth direction. M2 is chosen so that M3 is a product of prime numbers. The output from step (iv) is a data matrix P2m given by $$P2m = FFT_{M3/2+1}\{T\{FFT_N\{P1m\}\}\}. \quad (40)$$

The mask function 134 is also used in processing step (4) to reduce the number of multiplies in that process. The mth mask function MKm is given by $$Mkm_{ij} = 1, \text{ for } j \leq 2\pi\frac{(i-1)\cdot(m-1)}{M3} \text{ and } 1 \leq i \leq M3/2+1 \quad (41)$$

$$= 1, \text{ for } j \geq \pi M - 2\pi\frac{(i-1)\cdot(m-1)}{M3} \text{ and } M3/2+1 < i \leq M3$$

$$= 0, \text{ otherwise.}$$

In step (2), look averaging, data shifting in the radial direction, and zero padding 136 are performed. Let the two-dimensional CT data set 131 be represented by $S1=[s1_{ji}]_{i=1,2,\ldots,M, j=1,2,\ldots,N}$, and the output of this process be represented by S1A, where $S1A=[s1A_{ji}]_{i=1,2,\ldots,M3, j=1,2,\ldots,N}$. S1A is related to the input data S1 by $$S1A_{ji} = S1_{j,i} + S1_{j,M-i+1} \text{ for } 1 \leq i \leq M1+M/2+1 \quad (42)$$

$$= 0, \text{ for } M1+M/2+1 < i \leq M1+M2+M/2+1.$$

Step (3) includes (i) performing a 1-D FFT 137 along the radial direction, and (ii) multiplying 139 the spectral data with a radial filtering function. Let the output of this processing step be represented by S2, where $S2=[s2_{ji}]_{i=1,2,\ldots,M3, j=1,2,\ldots,N}$. S2 is related to the input data S1A by $$S2 = FFT_N\{S1A\} \cdot WR, \quad (43)$$

where WR is the radial filtering function. This function is given by the product of a ramp function and a one-dimensional window function, as shown in the following equation:

$$WR_{ji} = (i-1) \cdot WD(i), \text{ for } 1 \leq i \leq M3/2 \quad (44)$$

$$= |i-M3-1| \cdot WD(i), \text{ for } M3/2+1 \leq i \leq M3.$$

The window function serves to shape the impulse response of the reconstructed image.

Step (4) includes: (i) performing a matrix transpose 141, (ii) performing a 1-D FFT 142 along the azimuth direction, (iii) performing a do loop of reference function multiply 143, averaging 144 in the radial spectral dimension, multiplying azimuth weighting filter 145, performing an inverse FFT 146, and taking the real part 147 of the output data. This results in a tomography image in polar coordinates. The length of the do loop is M/2+1. The output data after spectral multiply is given by $$S3m_{ji}=S3_{ji} \text{ for } Mkm_{ji}=1, \text{ and}$$

$$S3m_{ji}=0 \text{ for } Mkm_{ji}=0,$$

$$\text{where } S3=S2 \cdot P2m^*, \tag{45}$$

where * stands for the complex conjugate operation. The averaging 143 in the radial spectral dimension for S3m can be expressed as $$S4m_j = \sum_{i=1}^{M3/2+1} S3m_{ij} \quad \text{for } j = 1 \text{ or } N/2+1 \tag{46}$$

$$= \sum_{i=1}^{M3/2+1} S3m_{ij} + \sum_{i=1}^{M3/2} S3m^*_{i,N-j+2} \quad \text{for } j = 2, \ldots, N/2$$

$$= S4m^*_{N-j+2} \quad \text{for } j = N/2+2, \ldots, N$$

After an inverse FFT process 146, the output data of this step is one image line representing the image of targets at a distance of $(m-1) \cdot \Delta r$ to the center of revolution. This one-dimensional image data is given by $$S5m = Scm \cdot Re \, al\{FFT\{S4m\}\}, \tag{47}$$

where Scm is a calibration scale factor applied to the m-th image line. After the do loop is completed, there are M/2+1 image lines. These images lines represent the reconstructed image in polar coordinates. Let this two-dimensional data be denoted as S5 and $S5=[S5_{mj}]_{m=1,2,\ldots,M/2+1, j=1,2,\ldots,N}$.

Step (5) includes a resampling process 150 to convert the tomography image from polar coordinates into Cartesian coordinates. Let x and y represent the index of horizontal and vertical direction of the Cartesian grid, respectively, and the sampling spacing of this grid is $\Delta r$. The center of this Cartesian grid is given by (M/2+1, M/2+1). The polar coordinates of (x,y) are given by (r(x,y), θ(x,y)), where $r(x,y)=\Delta r \cdot \sqrt{(x-M/2-1)^2+(y-M/2-1)^2}$ and $\theta(x,y)=\tan^{-1}(y-M/2-1, x-M/2-1)$. The image value at (x,y) where $r(x,y) \leq M/2 \cdot \Delta r$ is given by the weighted sum of $S5_{mj}$, i.e., $$S6_{xy} = \sum_{i=1-\frac{N_p}{2}+1}^{N_{p/2}} \sum_{m=1-\frac{N_p}{2}+1}^{N_{p/2}} W(m-m0, j-j0) \cdot S5_{m0+m, j0+j} \tag{48}$$

where $$m0 = int\left(\frac{r(x,y)}{\Delta r}\right)+1 \text{ and } j0 = int\left(Mod\left(\frac{N \cdot \theta(x,y)}{2\pi}+N, N\right)\right)-1 \tag{49}$$

$N_p$ is the number of points involved in this interpolation process in each direction, and W(m−m0,j−j0) is the interpolator weight coefficient.

Fourth Embodiment

Another embodiment of image reconstruction for a fan beam CT system is also represented by the flow diagram shown in FIG. 7. Image reconstruction in this embodiment includes five processing steps: (1) preprocessing 71 to generate the reference spectra 72 and their mask functions 73; (2) zero padding 75 in the radial direction so that the number of samples is a product of prime numbers; (3) filtering 76 in the radial direction; (4) performing a FFCC 79, where the output of this step is the reconstructed image in polar coordinate; and (5) interpolating 87 to convert the reconstructed image from polar coordinates into Cartesian coordinates. To process several CT data sets 74, only step (2) through step (5) are performed for each data set, i.e., there is no need to repeat step (1) for each data set.

In step (1), M/2+1 sets of masks 73 and spectra 72 are generated to be used as reference functions in the FFCC described in step (4). These spectra 72 represent the Fourier transformed results of point target line trace functions of a fan beam system. Let Pm represent the line trace function of a point target located at $((m-1) \cdot \Delta r, 0)$ in polar coordinates. $\Delta r$ is the minimum sensor spacing along the x dimension. The $^m$th point target line trace function Pm can be expressed as $$Pm_{j,i} = \frac{\sin(2\pi(i-ai(j)))}{2\pi(i-ai(j))}, i=1,2,\ldots,M, \text{ and } j=1,2,\ldots,N, \tag{50}$$

where ai(j)=i0(j)+di(j), i0(j) is an integer determined by $\gamma(i0(j)) \leq \gamma 1 < \gamma(i0(j)+1)$, di(j) is a fractional number given by $$di(j) = \frac{\gamma 1 - \gamma(i0(j))}{\gamma(i0(j)+1) - \gamma(i0(j))},$$

and the target sensing angle γ1 is given by $$\gamma 1 = \tan^{-1}\left(\frac{(m-1) \cdot \Delta r \cdot \sin(\theta(j))}{r_s - (m-1) \cdot \Delta r \cdot \cos(\theta(j))}\right), \tag{51}$$

$$\text{where } \theta(j) = \text{sign} \cdot (j-1) \cdot \frac{2\pi}{N}.$$

Pm covers a 360° view range and consists of target responses from detector 1 through detector M.

In equation (51) the sign of θ(j) is equal either +1 when the x-ray source rotates counterclockwise or −1 when the x-ray source rotates clockwise. Generating reference functions from the point target line trace function includes: (i) data shifting and zero padding, (ii) performing a 1-D FFT along the radial direction, (iii) performing a data matrix transpose process, (iv) performing a 1-D FFT along the azimuth direction. Let the output from step (i) be P1m. P1m can be expressed as $$P1m_{ji} = Pm_{j,i} \text{ for } 1 \leq i \leq M \tag{52}$$

$$= 0, \quad \text{for } M+1 \leq i \leq M3.$$

The matrix P1m has M3 elements in the radial direction, where M3 is a product of prime numbers. The output data matrix P2m can be expressed as $$P2m=FFT_{M3/2+1}\{T\{FFT_N\{P1m\}\}\}. \tag{53}$$

The mask function 73 is also used in processing step (4) to reduce the number of multiplies in that process. The $^m$th mask function MKm 73 is given by equation (54) if the x-ray source rotates counterclockwise and given by equation is (55) if the x-ray source rotates clockwise.

$$Mkm_{ij} = 1, \text{ for } j \leq 2\pi \frac{(i-1)\cdot(m-1)}{M3} \cdot c_1 \text{ and } i \leq M3/2+1 \quad (54)$$

$$= 1, \text{ for } j \geq \pi M - 2\pi \frac{(i-1)\cdot(m-1)}{M3} \cdot c_2 \text{ and } M3/2+1 \triangleleft i \leq M3$$

$$= 0, \text{ otherwise}$$

$$Mkm_{ij} = 1, \text{ for } j \leq 2\pi \frac{(i-1)\cdot(m-1)}{M3} \cdot c_2 \text{ and } i \leq M3/2+1 \quad (55)$$

$$= 1, \text{ for } j \geq \pi M - 2\pi \frac{(i-1)\cdot(m-1)}{M3} \cdot c_1 \text{ and } M3/2+1 \triangleleft i \leq M3$$

$$= 0, \text{ otherwise}$$

where $c_1$ and $c_2$ are given by $c_1 = r_s/(r_s-(m-1)\cdot\Delta r)$, $c_2 = r_s/(r_s+(m-1)\cdot\Delta r)$.

In step (2), data shifting and zero padding 75 are performed. Let the two-dimensional CT data set 74 be represented by $S1 = [s1_{ji}]_{i=1,2,\ldots,M, j=1,2,\ldots,N}$. Let the output of this processing step be represented by S1A, where $S1A = [s1A_{ji}]_{i=1,2,\ldots,M3, j=1,2,\ldots,N}$. S1A is related to the input data S1 by $$S1A_{ji} = S1_{j,i} \text{ for } 1 \leq i \leq M \quad (56)$$

$$= 0, \text{ for } M \triangleleft i \leq M3.$$

Step (3) includes (i) performing a 1-D FFT 77 along the radial direction, and (ii) multiplying 78 the spectral data with a radial filtering function. Let the output of this processing step be represented by S2, where $S2 = [s2_{ji}]_{i=1,2,\ldots,M3, j=1,2,\ldots,N}$, S2 is related to the input data S1A by $$S2 = FFT_N\{S1A\} \cdot WR, \quad (57)$$

where WR is the radial filtering function. This function is given by the product of a ramp function and a one-dimensional window function, as shown in the following equation:

$$WR_{ji} = (i-1) \cdot WD(i), \text{ for } 1 \leq i \leq M3/2 \quad (58)$$

$$= |i - M3 - 1| \cdot WD(i), \text{ for } M3/2 + 1 \leq i \leq M3.$$

The window function serves to shape the impulse response of the reconstructed image.

Step (4) includes: (i) performing a matrix transpose 80, (ii) performing a 1-D FFT 81 along the azimuth direction, (iii) performing a do loop of reference function multiply 82, averaging 83 in the radial spectral dimension, multiplying azimuth weighting filter 84, performing an inverse FFT 85, and taking the real part 86 of the output data. This results in a tomography image in polar coordinates. The length of the do loop is M/2+1. The output data after spectral multiply is given by $$S3m_{ji} = S3_{ji} \text{ for } Mkm_{ji} = 1,$$

$$S3m_{ji} = 0 \text{ for } Mkm_{ji} = 0,$$

$$\text{where } S3 = S2 \cdot P2m^*, \quad (59)$$

where * stands for the complex conjugate operation. The averaging in the radial spectral dimension for S3m can be expressed as $$S4m_j = \sum_{i=1}^{M3/2+1} S3m_{ij} \quad \text{for } j = 1 \text{ or } N/2+1 \quad (60)$$

$$= \sum_{i=1}^{M3/2+1} S3m_{ij} + \sum_{i=1}^{M3/2} S3m^*_{i,N-j+2} \quad \text{for } j = 2, \ldots, N/2$$

$$= S4m^*_{N-j+2} \quad \text{for } j = N/2+2, \ldots, N.$$

After an inverse FFT process 85, the output data of this step is one image line representing the image of targets at a distance of $(m-1)\cdot\Delta r$ to the center of the revolution. This one-dimensional image data is given by $$\vec{S5}m = Scm \cdot Re \; al\{FFT\{\vec{S4}m \cdot \vec{WA}m\}\}, \quad (61)$$

where Scm is a calibration scale factor applied to the m-th image line, and $\vec{WA}m$ is the weighting function designed for m-th image line. After the do loop is completed, there are M/2+1 image lines. These images lines represent the reconstructed image in polar coordinates. Let this two-dimensional data be denoted as S5 and $S5 = [S5_{mj}]_{m=1,2,\ldots,M/2+1, j=1,2,\ldots,N}$.

Step (5) involves a resampling process 87 to convert the tomography image from polar coordinates into Cartesian coordinates. Let x and y represent the index of horizontal and vertical direction of the Cartesian grid, respectively, and the sampling spacing of this grid is $\Delta r$. The center of this Cartesian grid is given by (M/2+1, M/2+1). The polar coordinates of (x,y) are given by (r(x,y), $\theta$(x,y)), where $r(x,y) = \Delta r \cdot \sqrt{(x-M/2-1)^2 + (y-M/2-1)^2}$ and $\theta(x,y) = \tan^{-1}(y-M/2-1, x-M/2-1)$. The image value at (x,y) where $r(x,y) \leq M/2 \cdot \Delta r$ is given by the weighted sum of $S5_{mj}$, i.e., $$S6_{xy} = \sum_{i=1-\frac{Np}{2}+1}^{N_{p/2}} \sum_{m=1-\frac{Np}{2}+1}^{N_{p/2}} W(m-m0, j-j0) \cdot S5_{m0+m,j0+j} \quad (62)$$

where $$m0 = int\left(\frac{r(x,y)}{\Delta r}\right) + 1 \text{ and } j0 = \quad (63)$$

$$int\left(Mod\left(\frac{N \cdot \theta(x,y)}{2\pi} + N, N\right)\right) - 1.$$

$N_p$ is the number of points involved in this interpolation process in each direction, and W(m−m0,j−j0) is the interpolator weight coefficient.

Figure 10:
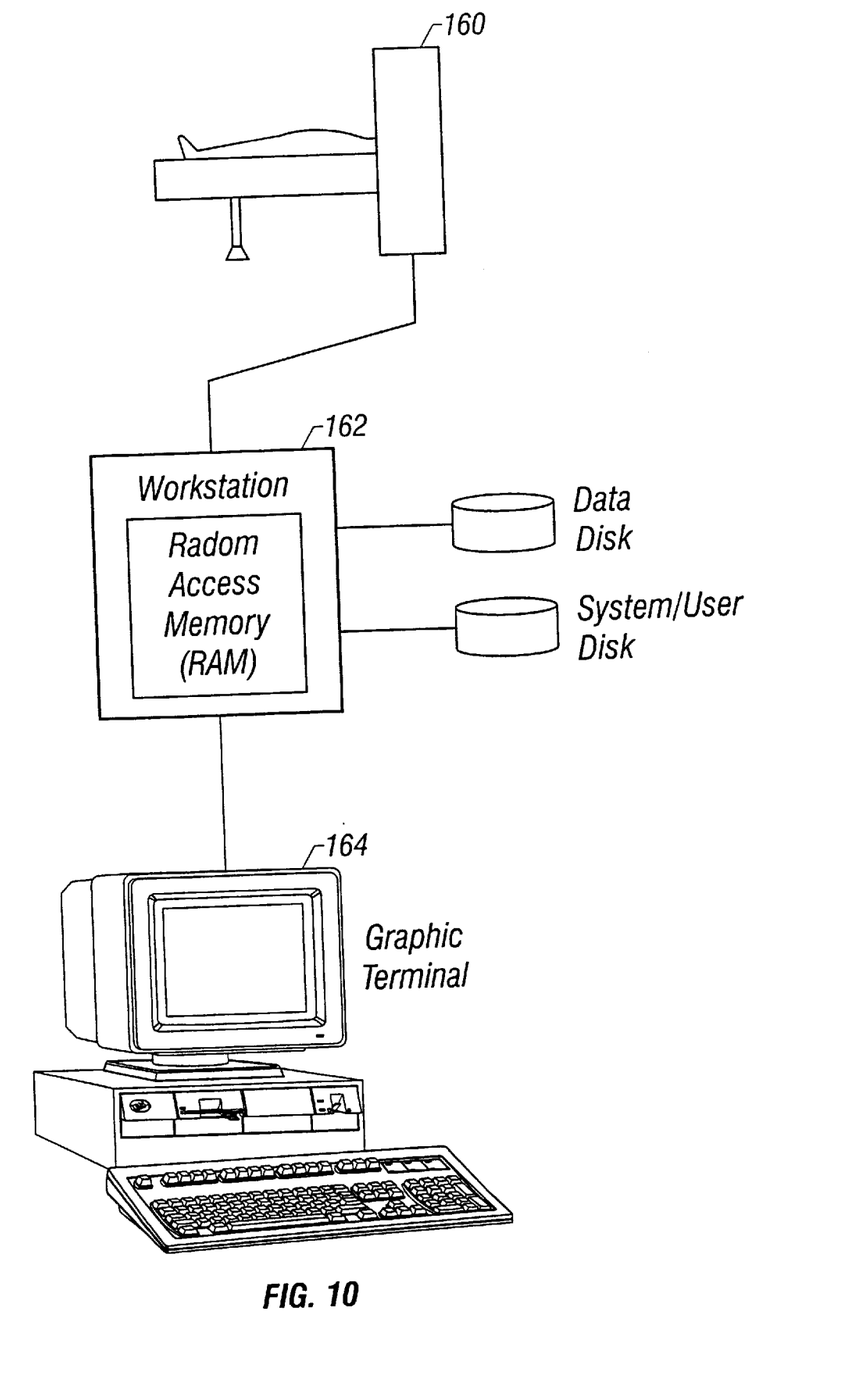
FIG. 10 is a block diagram of a computer system for implementing the present invention.

One embodiment of a CT scanning system according to the invention is shown in FIG. 10. A CT scanner 160 is operably connected with a workstation 1162, e.g., an Alpha Station 250 4/266 with 256 megabytes of RAM and a 2 gigabytes disk drive. The raw attenuation data is sent from the CT scanner to the workstation and stored on disk or in RAM. The attenuation data is processed by FFCC according to the invention and may me displayed on the terminal 164 or stored on disk. In one embodiment, the software is written in FORTRAN 77 and the disk I/O is written in the C language.

The following parameters may be set to process the attenuation data: numbers of views, number of detectors, radius of object circle, radius of x-ray source, radius of detectors, maximum gamma angle, maximum yita angle, detector spacing, and source rotation direction (clockwise or counterclockwise).

Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed is:

1. A method of reconstructing an image from scanned data having a radial and azimuth component, comprising:
   first generating reference spectra, wherein said first generating includes performing a fast Fourier transform along both a radial direction and along an azimuth direction;
   second generating mask functions;
   zero-padding the data;
   filtering the radial component of the data, to produce a spectra of a radially convoluted data;
   performing a fast two-dimensional Fourier Circular Convolution by using the reference spectra to produce a backprojected image; and
   converting the backprojected image from a polar coordinate into a Cartesian coordinate,
   wherein the scanned data comprises x-ray tomography attenuation data from a plurality of views, with M sensors per view,
   wherein the step of first generating reference spectra comprises:
   generating point target line trace functions;
   zero padding the point target line trace functions so that the number of samples in each view is the product of prime numbers;
   performing a fast Fourier transform of the point target line trace functions in the radial direction;
   transposing the one-dimensional spectra of the point target line trace functions; and
   performing a fast Fourier transform of the resulting data in the azimuth direction for one-half of the radial frequency space, resulting in M/2+1 reference spectra.

2. A computer program, residing on computer-readable medium, for reconstructing an image, comprising instructions to:
   first generate reference spectra, wherein said first generate includes performing a fast Fourier transform along both a radial direction and along an azimuth direction;
   second generate mask functions;
   zero-pad the data;
   filter the radial component of the data, which produces a spectra of a radially convoluted data;
   perform a fast two-dimensional Fourier Circular Convolution by using the reference spectra to produce a backprojected image; and
   convert said backprojected image from a polar coordinate into a Cartesian coordinate,
   wherein the scanned data comprises x-ray tomography attenuation data from a plurality of views, with M sensors per view,
   wherein the instructions to first generate reference spectra include instructions to:
   generate point target line trace functions;
   zero pad the point target line trace functions so that the number of samples in each view is the product of prime numbers;
   perform a fast Fourier transform of the point target line trace functions in the radial direction;
   transpose the one-dimensional spectra of the point target line trace functions; and
   perform a fast Fourier transform of the resulting data in the azimuth direction for one-half of the radial frequency space, resulting in M/2+1 reference spectra.

* * * * *

UNITED STATES PATENT AND TRADEMARK OFFICE
CERTIFICATE OF CORRECTION

PATENT NO.         : 5,937,102
APPLICATION NO. : 08/729230
DATED               : August 10, 1999
INVENTOR(S)       : Michael Y. Jin Page 1 of 1

It is certified that error appears in the above-identified patent and that said Letters Patent is hereby corrected as shown below:

In Column 1, Line 2, after "Image Reconstruction", please add the following paragraphs:

Federally Sponsored Research or Development

The invention described herein was made in the performance of work under a NASA contract, and is subject to the provisions of Public Law 96-517 (35 USC 202) in which the Contractor has elected to retain title.

Signed and Sealed this

Nineteenth Day of August, 2008

JON W. DUDAS
*Director of the United States Patent and Trademark Office*